(12) United States Patent
Dakic et al.

(10) Patent No.: US 11,475,155 B1
(45) Date of Patent: *Oct. 18, 2022

(54) UTILIZING A PROTECTED SERVER ENVIRONMENT TO PROTECT DATA USED TO TRAIN A MACHINE LEARNING SYSTEM

(71) Applicant: DeepIntent, Inc., New York, NY (US)

(72) Inventors: Vaso Dakic, Irvine, CA (US); Kelly Harold Patrick Gerritz, Astoria, NY (US); Christopher Thomas Paquette, New York, NY (US); Jennifer Werther Perlman, Hillsdale, NJ (US); Pavel Romanovski, Wallington, NJ (US); Anton Yazovskiy, Brooklyn, NY (US)

(73) Assignee: DeepIntent, Inc., New York, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/748,532

(22) Filed: Jan. 21, 2020

(51) Int. Cl.
 G06F 21/62 (2013.01)
 G06N 20/00 (2019.01)
 G06F 21/60 (2013.01)

(52) U.S. Cl.
 CPC ........ *G06F 21/6245* (2013.01); *G06F 21/602* (2013.01); *G06N 20/00* (2019.01)

(58) Field of Classification Search
 CPC .... G06F 21/6245; G06F 21/602; G06N 20/00
 See application file for complete search history.

(56) References Cited

U.S. PATENT DOCUMENTS 10,558,924 B2  2/2020 Achin
10,713,589 B1 * 7/2020 Zarandioon ............ G06N 20/20
(Continued)

OTHER PUBLICATIONS

Vrountas, 5 Examples That Show How Machine Learning is Changing Digital Advertising, updated in Advertising, 17 pages, Nov. 19, 2019.
Kaput, Artificial Intelligence in Advertising, 13 pages, Jan. 18, 2021.
M.I. Jordan et. al., *Machine learning: Trends, Perspectives, and Prospects*, Science vol. 349 Issue 6245 (2015), 7 pages, http://www.cs.cmu.edu/~tom/pubs/Science-ML-2015.pdf, Jul. 17, 2015.
(Continued)

*Primary Examiner* — Abiy Getachew
(74) *Attorney, Agent, or Firm* — Baker Botts L.L.P.

(57) ABSTRACT

Systems and methods for protecting information used to train a machine learning system are described herein. In an embodiment, first data identifying one or more status values of a plurality of personal data records are been sent to a server computer from a processor server and stored in a de-identified manner through a generation of a unique identifier for each personal data record using a unique identifier generation scheme and encrypted using an encryption scheme. Second data comprising a plurality of attributes for each of the plurality of personal data records are also sent to the server computer from a database and stored in a de-identified manner through a generation of the unique identifier for each personal data record using the unique identifier generation scheme and encrypted using the encryption scheme. An external server transmits, to the server computer, instructions to generate a machine learning system and to train the machine learning system using the first data and the second data. The server computer trains the machine learning system only if the first data and second data satisfy a first criterion and transmits the trained machine learning system only if the trained machine learning system satisfies a second criterion. The trained machine learning system is then used by the external server to determine whether to send a media item to one or more computing devices or to determine a value of sending the media item to the one or more computing devices.

31 Claims, 5 Drawing Sheets

(56) References Cited

U.S. PATENT DOCUMENTS

| | | | |
|---|---|---|---|
| 10,726,356 B1 | 7/2020 | Zarandioon | |
| 2003/0172043 A1* | 9/2003 | Guyon | G06N 20/00 |
| | | | 706/48 |
| 2010/0177950 A1 | 7/2010 | Donovan | |
| 2011/0054864 A1 | 3/2011 | Lundstedt | |
| 2011/0270779 A1 | 11/2011 | Showalter | |
| 2012/0150773 A1 | 6/2012 | DiCorpo | |
| 2012/0303558 A1 | 11/2012 | Jaiswal | |
| 2015/0317589 A1 | 11/2015 | Anderson | |
| 2017/0177907 A1 | 6/2017 | Scaiano | |
| 2017/0372029 A1 | 12/2017 | Salinnan | |
| 2019/0102802 A1* | 4/2019 | Tuschman | G06Q 30/0204 |
| 2019/0220705 A1 | 7/2019 | Min | |
| 2019/0260730 A1 | 8/2019 | Mainali | |
| 2019/0384469 A1 | 12/2019 | Lo | |
| 2020/0349169 A1 | 11/2020 | Venkatesan | |
| 2021/0090694 A1 | 3/2021 | Colley | |
| 2021/0097343 A1 | 4/2021 | Goodsitt | |

OTHER PUBLICATIONS

Mark J. van der Laan et al., *Entering the Era of Data Science: Targeted Learning and the Integration of Statistics and Computational Data Analysis*, Advances in Stat. Analysis (2014), 7 pages, https://www.hindawi.com/journals/as/2014/502678/, published Sep. 10, 2014.

Puja P. Pathak, *Logistic Regression and Maximum Likelihood Estimation Function*, Medium (Apr. 9, 2021), 9 pages, https://medium.com/codex/logistic-regression-and-maximum-likelihood-estimation-function-5d8d998245f9, Apr. 9, 2021.

Giuseppe Carleo et. al., *Machine Learning and the Physical Sciences*, 91 Rev. of Modern Physics (2019), 47 pages, at https://journals.aps.org/rmp/abstract/10.1103/RevModPhys.91.045002, Dec. 6, 2019.

Stacey Truex; A Hybrid Approach to Privacy-Preserving Federated Learning; ACM; 2019; pp. 1-11, 2019.

Payman Mohassel; SecureML: A system for Scalable Privacy-Preserving Machine Learning: IEEE: 2017; pp. 19-38, 2017.

\* cited by examiner

UTILIZING A PROTECTED SERVER ENVIRONMENT TO PROTECT DATA USED TO TRAIN A MACHINE LEARNING SYSTEM

FIELD OF THE DISCLOSURE

One technical field of the present disclosure machine learning systems in the field of artificial intelligence. Another technical field is computer-implemented data security and data protection applied to the training data that is used to train machine learning systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Machine learning systems have become popular for solving various types of problems based on training data. A key benefit of a machine learning system is the ability to learn based on data, bypassing any requirements for manual coding of an algorithm. Instead, the machine learning system generates an algorithm or model through repeated computations using the training data.

A potential drawback of machine learning systems is that determining specific internal operating mechanisms of the core machine learning engine can be difficult. Most machine learning systems are configured to generate fairly complex patterns based on the given training data. Because machine learning systems use complex algorithms and execute continuous learning, determining why a machine learning system produced a particular result from a set of input data can be difficult, if not impossible. In some situations, this can lead to a lack of accountability; in other situations, this feature protects the training data. Because a trained machine learning system exists separately from the training data, any data that is protected or sensitive data can be safeguarded during the use of the machine learning system.

A trained machine learning system inherently protects the data used to train it. However, the training phase can create issues, especially when the data used to train the machine learning system is robust but protected. Many people provide data under the assurance that data security measures will be used. As an example, the Health Insurance Portability and Accountability Act (HIPAA) has stringent requirements on the protection of medical claims data which would prevent a person from viewing any of the medical claims data to train a machine learning system.

Additionally, even when information is protected from viewing, the training data or machine learning system can still provide protected information to a viewer. For instance, a machine learning system using ten inputs could memorize a vast majority of people in the United States, thereby providing one-to-one recognition of individuals instead of providing an algorithm that produces a likelihood based on general patterns. But to validate the training data or the machine learning system would generally involve accessing the training data or machine learning system, thereby failing to provide the originally desired protections.

Thus, there is a need for a system that can protect personal, private, confidential, or otherwise protected information during training and validation of a machine learning system that utilizes the protected information.

SUMMARY

The appended claims may serve as a summary of the disclosure.

DETAILED DESCRIPTION

Figure 1:
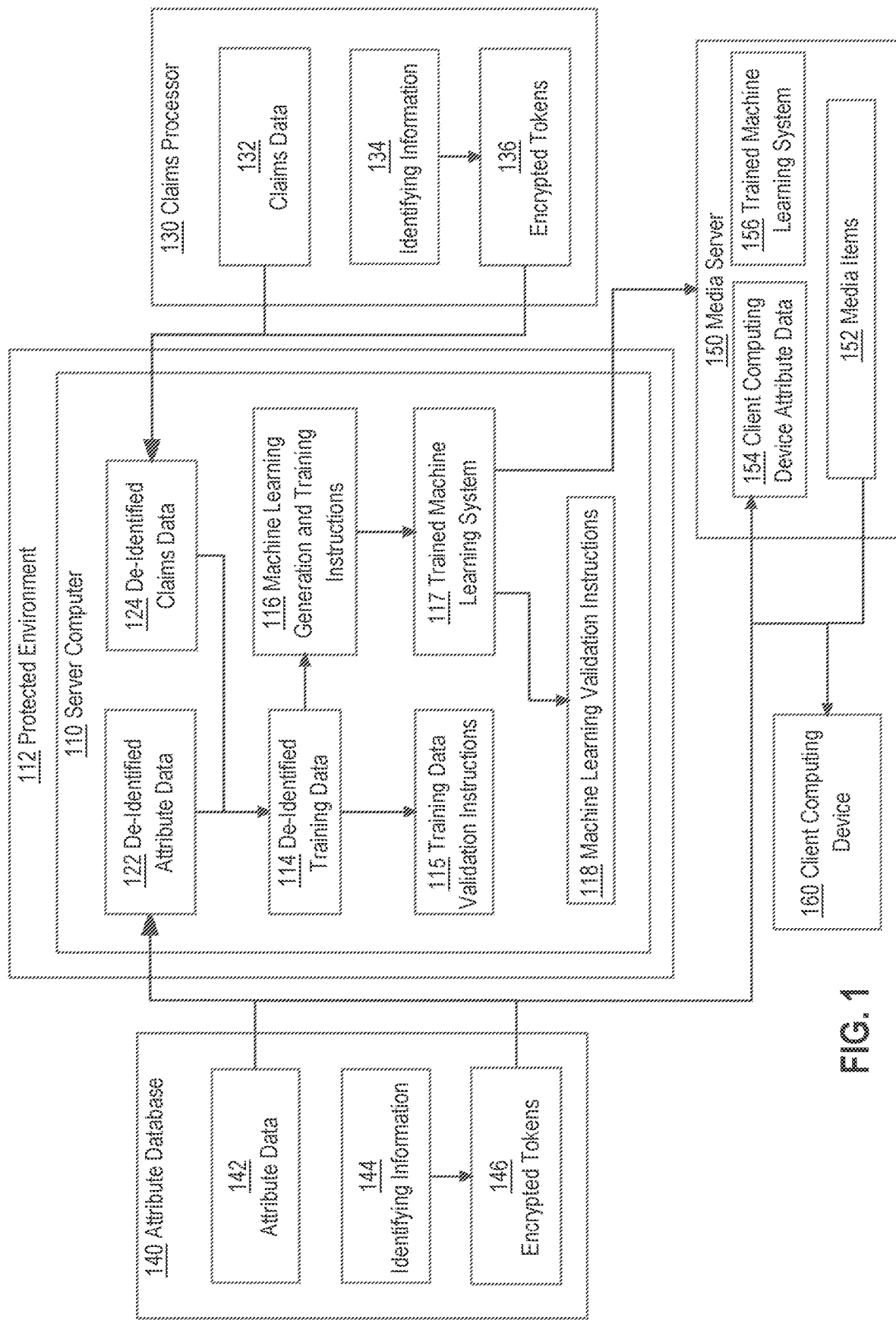
FIG. 1 depicts an example system for secure training and distribution of a machine learning system using protected data.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are described in the sections below according to the following outline:

1. GENERAL OVERVIEW
2. STRUCTURAL OVERVIEW
3. PROCESS OVERVIEW
4. PROTECTED ENVIRONMENT IMPLEMENTATION
5. MEDIA SERVER IMPLEMENTATION
6. OUTCOME IMPLEMENTATION
7. BENEFITS OF CERTAIN EMBODIMENTS
8. HARDWARE OVERVIEW

1. General Overview

Systems and methods for providing protection to information used in training machine learning models are described herein. In an embodiment, a server computer stores training data in a protected environment, the training data comprising a plurality of attributes and one or more status values for a plurality of personal data records. An external computing device sends a request to train a machine learning system using a subset of the plurality of attributes as inputs and a particular status value as the output. The server computer generates a training dataset and determines, within the protected environment, whether the training dataset satisfies a first criterion. If the training dataset satisfies the first criterion, the server computer generates a machine learning system, trains the machine learning system using the training dataset, and determines whether the trained machine learning system satisfies a second criterion. If the trained machine learning system satisfies the second criterion, the server computer sends the trained machine learning system out of the protected environment.

In an embodiment, a method is executed after the following steps have occurred: first data identifying one or more status values of a plurality of personal data records having been sent to a server computer from a processor server and stored in a de-identified manner through a generation of a unique identifier for each personal data record using a unique identifier generation scheme and encrypted using an encryption scheme; second data comprising a plurality of attributes for each of the plurality of personal data records having been sent to the server computer from a marketing database and stored in a de-identified manner through a generation of the unique identifier for each personal data record using the unique identifier generation scheme and encrypted using the encryption scheme; said first data and said second data having been sent to a server computer executing within a protected environment; the method comprising: electronically transmitting, to the server computer executing within the protected environment, instructions to generate a machine learning system and to train the machine learning system using the first data and the second data; the server computer being configured to train the machine learning system in the protected environment only if the first data and the second data satisfy a first criterion and is configured to transmit the trained machine learning system only if the trained machine learning system satisfies a second criterion; receiving the trained machined learning system from the protected environment; using the trained machine learning system, determining, for each of a plurality of sets of attributes, a likelihood that a personal data record corresponding to the set of attributes has a particular status value; if the likelihood that the personal data record corresponding to the set of attributes has the particular status value is greater than a threshold value, sending one or media items to a client computing device.

In an embodiment, a method comprises, storing, at a server computer executing within a protected environment, first data comprising a plurality of attributes for a plurality of personal data records and second data indicating, for each personal data record of the plurality of personal data records, secure data relating to a status value of the personal data record; receiving, from outside the protected environment, a request to generate and train a machine learning system using a subset of the first data comprising one or more of the plurality of attributes as inputs and a subset of the second data indicating whether a personal data record has a status value as outputs; determining, in the protected environment, whether the first data and second data satisfy a first criterion with relation to the status value; only if the first data and second data satisfy the first criterion with respect to the status value, training a machine learning system using the subset of the first data as inputs and the subset of the second data as outputs; determining, in the protected environment, whether the trained machine learning system satisfies a second criterion; only if the trained machine learning system satisfies the second criterion, transmitting the trained machine learning system outside the protected environment in response to the request.

In an embodiment, a method comprises sending, to a server computer executing within a protected environment, instructions to generate and train a machine learning system using attributes as inputs and existences of a status value as outputs, the server computer storing first data comprising a plurality of attributes for a plurality of personal data records and second data indicating, for each personal data record of the plurality of personal data records, whether the personal data record has the status value; wherein the server computer is configured to only train the machine learning system in the protected environment if the first data and the second data satisfy a first criterion and is only configured to transmit the trained machine learning system if the trained machine learning system satisfies a second criterion; receiving the trained machined learning system from the protected environment; using trained machine learning system, determining, for each of a plurality of sets of attributes, a likelihood that a personal data record corresponding to the set of attributes has the status value; if the likelihood that the personal data record corresponding to the set of attributes has the status value is greater than a threshold value, sending one or more media items to a client computing device corresponding to the personal data record.

2. Structural Overview

FIG. 1 depicts an example system for secure training and distribution of a machine learning system using protected data. Server computer 110, claims processor 130, attribute database 140, media server 150, and client computing device 160 are communicative coupled over one or more networks. The network(s) broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, claims processor 130, attribute database 140, media server 150, client computing device 160, and other elements of the system each comprise an interface compatible with the network(s) and are programmed or configured to use standardized protocols for communication across the networks such as TCP/IP, Bluetooth, CAN protocol and higher-layer protocols such as HTTP, TLS, and the like.

Claims processor 130 comprises one or more computing systems configured to receive and store claims data. Claims processor 130 stores claims data 132 and identifying information 134. Claims data 132 comprises data identifying one or more status values for a plurality of personal data records. For example, claims data may comprise medical claims records identifying diagnosis codes, such as the International Statistical Classification of Diseases and Related Health Problems (ICD) codes, codes for procedures such as Current Procedural Terminology (CPT) codes, codes associated with healthcare providers (HCPs), Healthcare Common Procedure Coding System (HCPCS) codes, or J codes, or NDC codes for prescriptions. The status values may comprise existence or non-existence of specific codes, such as an ICD-10 code for a diagnosis of Type II diabetes. The claims data 132 may be associated with identifying information 134, such as names, addresses, birthdates, or other identifying information of a personal data record. Claims processor 130 uses the identifying information 134 to generate encrypted tokens 136 using the methods described herein. Claims processor 130 sends claims data 132 with encrypted tokens 136 to server computer 110. Additionally or alternatively, claims processor 130 may send the claims data 132 and identifying information 134 to a tokenization server which then generates the encrypted tokens 136 from the identifying information using the methods described herein and sends the encrypted tokens and claims data to server computer 110.

Attribute database 140 comprises a data store, such as a relational database or other structured data storage, configured to store attribute information for a plurality of personal data records. Attribute database 140 stores attribute data 142 and identifying information 144. Attribute data 142 may comprise individual values for a plurality of values. For example, attribute database 140 may store a plurality of rows, each of the plurality of rows corresponding to a different personal data record, and a plurality of columns, each of the plurality of columns corresponding to a different attribute. Attributes may include personal information such as age, physical activity level, weight, hair color, and/or eye color, data relating to an online search history, such as existence of particular search terms, websites visited, or other internet history, or data relating to one or more online accounts, such as social network accounts or other memberships. The attribute data 142 may be associated with identifying information 144 such as names, addresses, birthdates, or other identifying information of a personal data record. Attribute database 140 uses identifying information 144 to generate encrypted tokens 146 using the methods described herein. Attribute database 140 sends attribute data 142 with encrypted tokens 146 to server computer 110. Additionally or alternatively, attribute database 140 may send the attribute data 142 and identifying information 144 to a tokenization server which then generates the encrypted tokens 146 from the identifying information using the methods described herein and sends the encrypted tokens and attribute data to server computer 110.

Server computer 110 comprises one or more computing devices configured to generate and train one or more machine learning systems. Server computer 110 may be a physical server computer and/or a virtual server instance stored in a data center, such as through cloud computing. Server computer 110 may be configured to generate and train the machine learning system within protected environment 112. Protected environment 112 comprises a hardware or software environment which may include one or more server computers, such as server computer 110, one or more local networks, a load balancer, and/or data storage. Protected environment 112 is configured to protect data stored within the environment, such as through a firewall or other network security systems which restricts access through a network, such as the internet, to the various systems or devices within the protected environment. The protected environment 112 may be configured to not release data from the environment that does not meet certain criteria, as described further herein. In this manner, the protected environment may be used as a barrier to protect specific types of information, such as confidential information or restricted-use data, such as medical claims which are protected under HIPAA.

Server computer 110 stores de-identified attribute data 122 received from attribute database 140 and de-identified claims data 124 received from claims processor 130. The de-identified attribute data 122 and de-identified claims data 124 may comprise attributes and claims respectfully which are mapped to encrypted tokens but do not include any identifying information. Methods for generating the de-identified data are described further herein. Server computer 110 uses the de-identified attribute data 122 and de-identified claims data 124 to create de-identified training data 114 which server computer 110 stores. Server computer 110 further stores training data validation instructions 115, machine learning generation and training instructions 116, and machine learning validation instructions 118. De-identified training data 114 may be stored as a plurality of rows of data, each row corresponding to a different personal data record. The plurality of rows of data may include columns corresponding to different attributes of the personal data records and columns corresponding to status values, such as diagnosis codes, of the personal data records.

Training data validation instructions 115 comprise computer-readable instructions which, when executed by one or more processors of server computer 110, cause server computer 110 to determine whether a training dataset satisfies one or more criteria and perform a responsive action depending on whether the training dataset satisfies the one or more criteria. Machine learning generation and training instructions 116 comprise computer-readable instructions which, when executed by one or more processors of server computer 110, cause server computer 110 to generate a machine learning system based on one or more instructions and to train the machine learning system using de-identified training data 114. Machine learning validation instructions 118 comprise computer-readable instructions which, when executed by one or more processors of server computer 110, cause server computer 110 to determine whether a machine learning system satisfies one or more criteria and perform a responsive action depending on whether the training dataset satisfies the one or more criteria.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 110.

The server computer 110 uses machine learning generation and training instructions 116 and de-identified training data 114 to generate trained machine learning system 117. For example, the server computer 110 may generate a training dataset from the de-identified training data 114 based on one or more instructions and use the training dataset to train a machine learning system generated by the server computer based on one or more instructions. Server computer 110 sends the trained machine learning system 117 to the media server 150.

Media server 150 comprises one or more computers configured to send media to one or more client computing devices in response to a request. Media server 150 stores media items 152 and trained machine learning system 156 received from server computer 110. Media items 152 comprise one or more images, videos, or other media items that may be served to a client computing device. Media server 150 is configured to communicate with client computing device 160 to determine whether to send a media item of media items 152 to client computing device 160. Media server 150 determines whether to send a media item using client computing device attribute data 154 stored in media server 150.

Client computing device attribute data 154 comprises one or more attributes corresponding to the client computing device 160, such as attributes relating to a personal data record corresponding to the client computing device. Client computing device attribute data 154 may be received from client computing device 160, attribute database 140, and/or one or more other attribute sources. For example, the media server 150 may receive identifying information from client computing device 160 which the media server 150 sends to the attribute database 140 with a request for attribute data relating to client computing device 160.

While FIG. 1 depicts a single instances of server computer 110, attribute database 140, claims processor 130, media server 150, and client computing device 160 for the purpose of demonstrating a clear example, in some embodiments, the systems and devices in FIG. 1 may comprise a plurality of different systems or devices. For example, server computer 110 may comprise a plurality of server computers and/or external storage devices which store attribute data, claims data, training data, and/or any other data stored within protected environment 112. As another example, server computer 110 may communicate with a plurality of media servers 150, each of which may communicate with a plurality of client computing devices 160.

3. Process Overview

Figure 2:
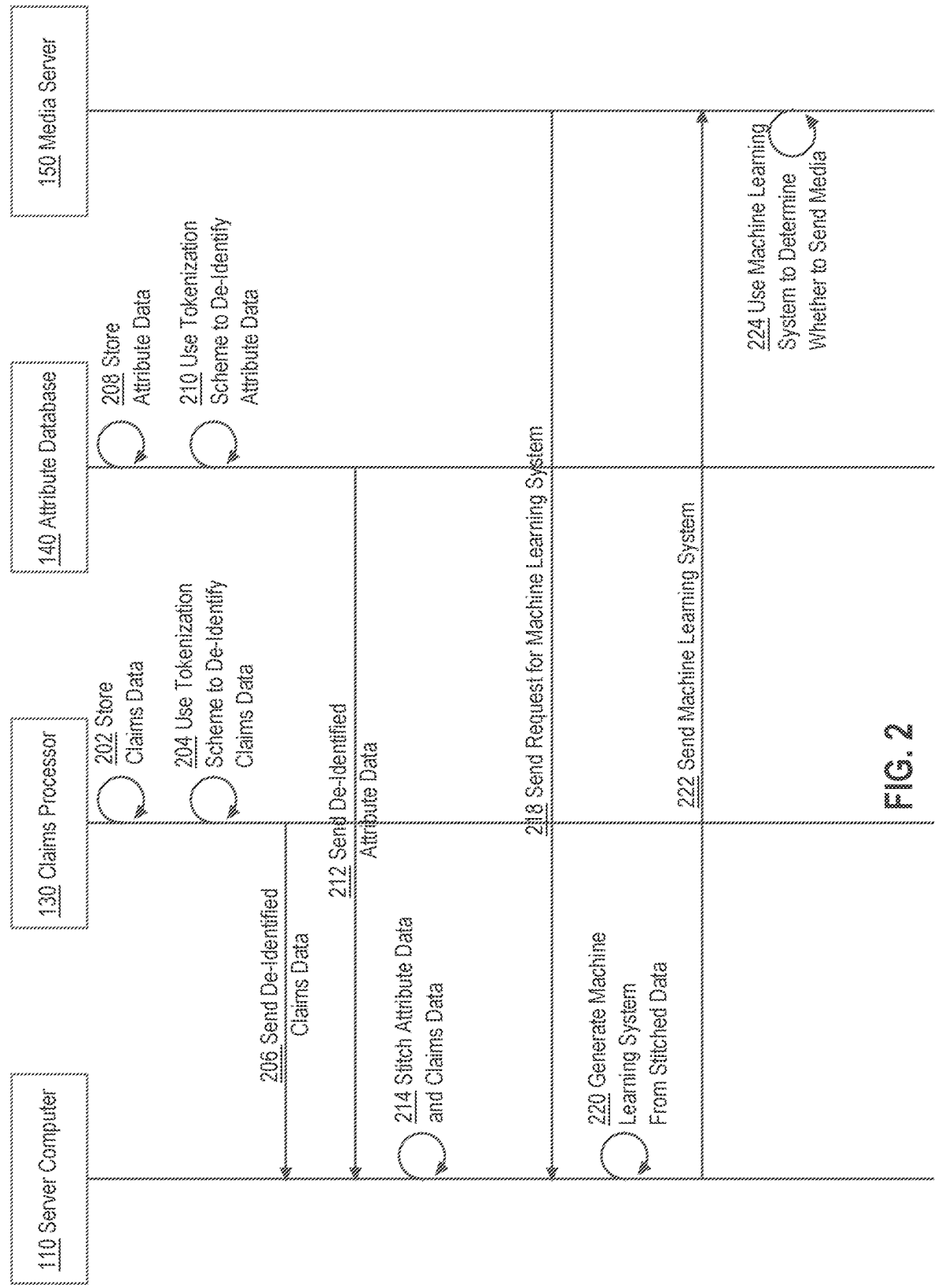
FIG. 2 depicts an example message diagram by which protected information is securely used to generate and train a machine learning system.

FIG. 2 depicts an example message diagram by which protected information is securely used to generate and use trained machine learning systems. FIG. 2 and other flow diagrams that are described herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

At step 202, claims processor 130 stores claims data. Claims data, as used herein, refers to status value data for one or more personal data records. Personal data records, as used herein, refer to a record of an individual with one or more values relating to said individual. Thus, an individual claims data record may identify a status of an individual as well as identify the individual through identification information, such as a name, birthdate, social security number, address, or other identifying information. The status of the individual may include a medical status, personal status, legal status, or any other data value relating to a status which may be stored in claims data records. For example, an individual claims data record may include a medical diagnosis from a medical professional. An example claims processor may comprise an intermediary between medical professionals and insurance agents, thus receiving medical records comprising protected data, such as diagnoses or prescriptions, which are then routed to insurance agents.

At step 204, claims processor 130 uses a tokenization scheme to de-identify the claims data. For example, the claims processor may create a data token by hashing specific pieces of identifying information, such as first name, last name, zip code, and date of birth, using a particular hash function and encrypting the hashed information. The claims processor may then create de-identified claims data comprising the data token and one or more status data values for the data token. As a practical example, if a claims data record comprised a full name, zip code, date of birth, and medical diagnosis for a personal data record, the claims processor 130 may generate the token using the identifying information and store a de-identified data record comprising the token and the medical diagnosis. As the token is generated from identifying information for a personal data record, the token is unique for each personal data record. While the disclosure describes a data token generated through hashing of identifying information and encryption of the hashed information, any identifying algorithmic scheme for generating a unique data token from identifying information may be used.

At step 206, claims processor 130 sends de-identified claims data to server computer 110. For example, claims processor 130 may send the plurality of tokens and corresponding status values for each of the plurality of tokens to server computer 110 which server computer 110 stores as de-identified claims data. Claims processor 130 may send the de-identified claims data as a plurality of data records, each of which comprising a unique token but not including any identifying information.

At step 208, attribute database 140 stores attribute data. Attribute data, as used herein, refers to a plurality of attribute data values for one or more personal data records. Thus, an individual attribute data record may identify a plurality of attributes of an individual as well as identify the individual through identification information, such as a name, birthdate, social security number, address, or other identifying information. Attributes may include known information relating to personal data records, such as personal information, internet history information, account information, or other stored information. In embodiments, attribute database 140 may store data relating to hundreds of attributes with data records containing information relating to a subset of the hundreds of attributes, such as when attribute data is unavailable for a particular personal data record for one or more of the attributes.

At step 210, attribute database 140 uses a tokenization scheme to de-identify the attributed data. In an embodiment, the tokenization scheme used by attribute database 140 to de-identify the attribute data is the same tokenization scheme used by claims processor 130 to de-identify the claims data. For example, if the tokenization scheme used by the claims processor involved using a particular hash function to hash a string comprising a first name, last name, and zip code and encrypting the hashed string using a particular encryption key, the tokenization scheme used by attribute database 140 may also use the particular hash function to hash the same string and encrypt the same hashed string using the same particular encryption key. In this manner, despite both claims processor 130 and attribute database 140 de-identifying information separately, the same token is created by both claims processor and attribute database 140 for the same personal data record. Additionally or alternatively, the tokenization may be provided by a tokenization server which uses the same method to generate tokens for claims processor 130 and attribute database 140. Attribute database 140 may then create the de-identified attribute data comprising, for each personal data record, a token and values for one or more of the attributes.

At step 212, attribute database 140 sends de-identified attribute data to server computer 110. For example, attribute database 140 may send the plurality of tokens and corresponding attribute values for each of the plurality of tokens to server computer 110 which server computer 110 stores as de-identified attribute data. Attribute database 140 may send the de-identified attribute data as a plurality of data records, each of which comprising a unique token but not including any identifying information.

At step 214, server computer 110 stitches attribute data and claims data into a stitched data set. For example, server computer 110 may generate a plurality of rows of data, each row corresponding to a particular personal data record. One example of a stitching technique may comprise a left join of the claims data to the attribute data, thereby keeping all attribute data but only storing, in the de-identified training data, claims data stored with a token that corresponds to a token of the attribute data. As another example, server computer 110 may identify claims data comprising a particular token and attribute data comprising the same particular token. Server computer 110 may generate a row of data for the particular token, the row of data comprising a plurality of columns for a plurality of attributes based on the attribute data and one or more columns for one or more status values based on the claims data. Thus, while each row comprises attribute data for a personal data record and claims data for the personal data record, the rows do not include identifying information for the personal data record.

While the systems and methods described in reference to FIG. 1 include the tokenization of identifying information, in other embodiments, the identifying information may not be tokenized and/or encrypted. For example, claims data 132, identifying information 134, attribute data 142, and identifying information 144 may be sent directly to the server computer where the server computer, in the protected environment stitches together the two datasets using the identifying information instead of using the encrypted tokens to match claims data to attribute data.

At step 218, media server 150 sends a request to server computer 110 for a machine learning system. The request may be sent through an application programing interface of the server computer 110 and may comprise identifications of input columns and output columns from the stitched data. For example, the request may identify a subset of the plurality of attributes to be used as inputs and existence of a particular status value as an output. The request may additionally include parameters for the machine learning system, such as number of nodes or layers.

At step 220, server computer 110 generates a machine learning system from the stitched data based on the request. For example, the server computer 110 may generate a machine learning system, such as a random forest model, neural network, logistic regression, or gradient boosted decision tree such as the XGBoost algorithm, using stored parameters and/or parameters received from media server 150. The server computer 110 may then train the machine learning system using the attributes identified by media server 150 as inputs and a status value for a particular status as an output.

As a practical example, media server computer may identify five input attributes of age, gender, average number of checkups, weight, and height and an output status value indicating existence or non-existence of a diabetes diagnosis. Server computer may identify corresponding columns of the attribute data and claims data and generate a training dataset using only those columns. Additionally or alternatively, the server computer may generate a column where data in the column is non-numerical or stored in a different manner. For example, if a status value column stored at server computer 110 includes, for each row, one or more diagnosis codes for diagnoses corresponding to a personal data record, the server computer 110 may generate a column for a particular diagnosis code by including, in each row of the column, a '0' value if the row did not include the particular diagnosis code and a "1" if the row did include the particular diagnosis code.

At step 222, server computer 110 sends the machine learning system to media server 150. In an embodiment, server computer 110 validates one or more of the training dataset used to train the machine learning system or the trained machine learning system using the methods described herein prior to sending the machine learning system to media server 150. The trained machine learning system may be sent in a form that is readily usable by media server 150, such as a matrix of weights for the machine learning system.

At step 224, media server 150 uses the machine learning system to determine whether to send media to a client computing device. For example, media server 150 may receive attribute data for the client computing device. The attribute data may include values for each attribute that was used to train the machine learning system. Media server 150 may use the machine learning system to compute, from the attribute data for the client computing device, a likelihood of existence of the status. Based on the likelihood of existence of the status, media server 150 may send a related media item to the client computing device. For example, media server 150 may determine whether the likelihood is greater than a threshold value and, if the likelihood is greater than the threshold value, send the media item to be displayed on the client computing device.

4. Protected Environment Implementation

Figure 3:
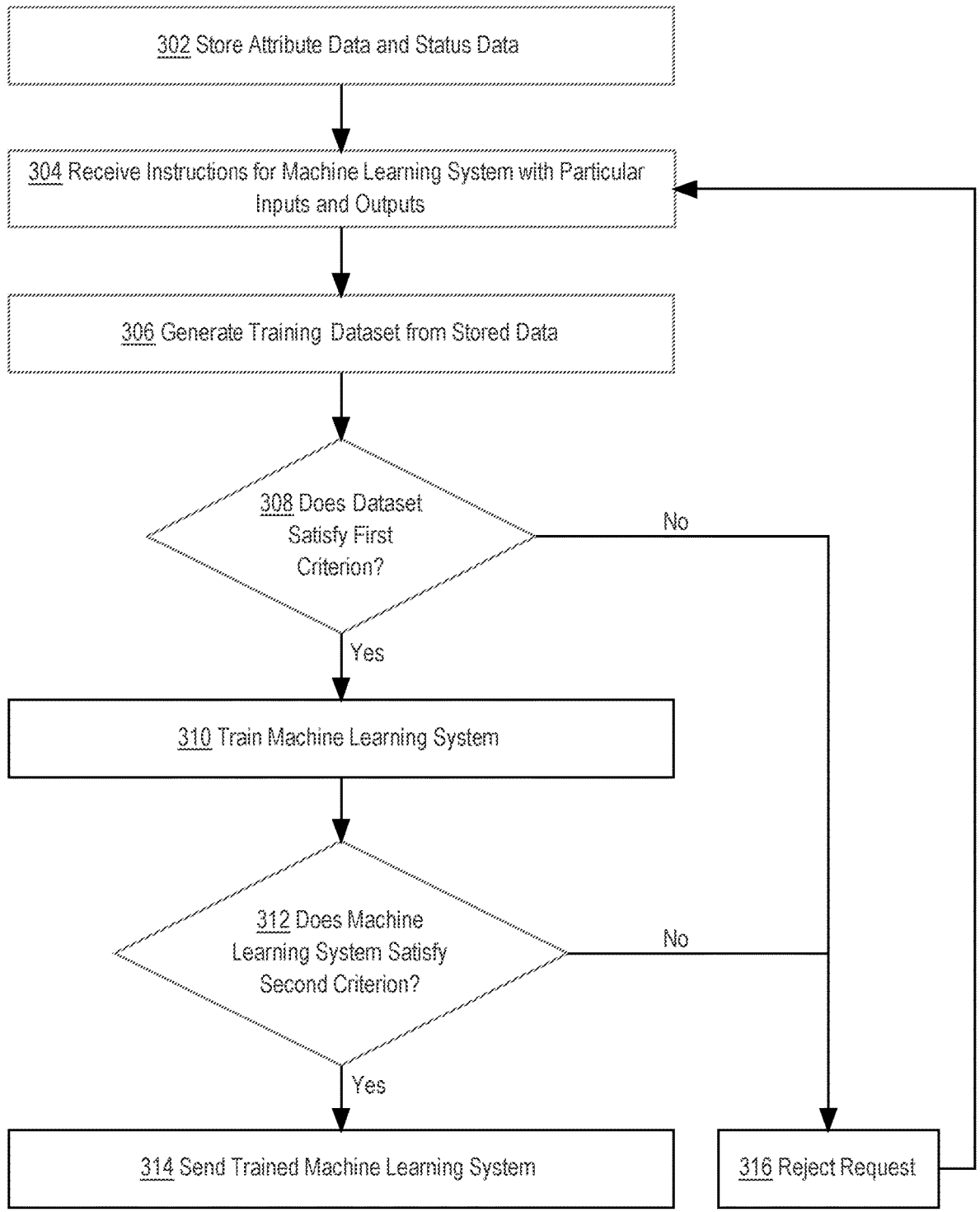
FIG. 3 depicts an example method for building and validating a machine learning system in a protected environment.

FIG. 3 depicts an example method for building and validating a machine learning system in a protected environment.

At step 302, a server computer within a protected environment stores attribute data and status data. For example, the server computer may store a plurality of columns of data, each column corresponding to a different attribute with values in each row indicating an attribute value for a particular personal data record. The server computer may additionally store one or more columns of data identifying status values, such as ICD-10 codes.

At step 304, the server computer receives instructions to generate a machine learning system with particular inputs and outputs. The instructions may identify which attributes to use as inputs and presence or absence of a status value as an output. For example, instructions may specify inputs as age, gender, weight, and height and an output as presence or absence of the ICD-10 code for Type 2 Diabetes. The instructions may also identify parameters for the machine learning system, such as a number of layers or number of nodes. Additionally or alternatively, the server computer may store parameters for the machine learning system and/or be configured to vary parameters for the machine learning system in response to the machine learning system failing to satisfy one or more criteria.

At step 306, the server computer generates a training dataset from stored data. For example, the server computer may initially identify personal data records that have values for each of the selected inputs. For example, some personal data records may lack a value for 'age' or 'gender' and may thus not be used to generate a training dataset if the instructions identified age and gender as inputs. The server computer may generate a training dataset for a plurality of personal data records with attribute values set as inputs and existence or non-existence of a status value as the output.

For example, if the output was specified as existence of a particular ICD-10 code, then outputs for personal data records which included the particular ICD-10 code may be set to 1 while outputs for personal data records which did not include the particular ICD-10 code may be set to 0.

In an embodiment, generating the training dataset comprises selecting a subset of the stored data which could be used to generate the training dataset. For example, if three thousand data records include the required attributes, the server computer may select less than the three thousand data records to train the machine learning system. The number of records used may be identified in the received instructions and/or may be a stored percentage value. For instance, the server computer may be configured to only use half of the available records. Additionally or alternatively, the server computer may select records such that a minimum number of records with the output are used for training and a minimum number of records with the records are not used for training, thereby ensuring that the machine learning system is unable to memorize all stored personal data records.

At step 308, the server computer determines whether the dataset satisfies a first criterion. The first criterion may comprise a minimum number of instances of a positive value for the output. The server computer may be configured to determine whether there are at least a threshold number of instances of personal data records with the status value as an output. For example, if the output value is a particular ICD-10 code, the server computer may determine if at least a threshold number of data records in the stored data which can be used to build the training dataset comprise the particular ICD-10 code. The threshold number may be a value stored at the server computer or identified in the received instructions. The first criterion may additionally or alternatively include a minimum number of instances of personal data records without the status value as an output, a minimum and/or maximum ratio between personal data records with the status value as an output and data records without the status value as an output, and/or a minimum number of remaining data records that were not used in the generation of the training dataset that include the status value and/or do not include the status value.

Step 308 may be performed before the generation of the training dataset, thereby determining whether a training dataset generated from the stored data could satisfy the first criterion. For example, if the first criterion is a minimum number of instances of a particular ICD-10 code, the server computer may initially identify each data record which could be used to generate the training dataset and determine whether a number of the data records meets or exceeds the minimum number. In an embodiment, the server computer determines whether the stored data includes the minimum number of instances of the status value generally in addition to determining whether the stored data which could be used to build the training dataset includes the minimum number of instances of the status value. Thus, the server computer may distinguish between whether any training dataset could meet the first criterion when using the identified status value as an output or whether a training dataset using the requested attributes as inputs could meet the first criterion when using the identified status value as an output.

If the dataset does not satisfy the first criterion, at step 316 the server computer rejects the request for a machine learning system. For example, the server computer may send data to a requesting computing device rejecting the request for the machine learning system. The rejection may state that the first criterion was not satisfied. In an embodiment, the rejection additionally identifies whether the first criterion could be satisfied with different inputs, such as when a minimum number of instances of the output status value exists, but does not exist in records which comprise attribute values for the requested inputs.

If the dataset does satisfy the first criterion, at step 310 the server computer trains a machine learning system using the training dataset. For example, the server computer may generate a new machine learning system using received and/or stored values for the parameters of the machine learning system. The machine learning system may comprise a logistic regression model, neural network, random forest model, gradient boosted decision tree, and/or any machine learning system which can be used to solve a classification problem. In an embodiment, the received instructions specify a type of machine learning system to train from a plurality of types of machine learning systems. For example, the server computer may store instructions for generating any of a plurality of machine learning systems. The server computer may receive instructions specifying which of the plurality of machine learning systems to generate and train. The server computer may generate the machine learning system using stored parameters and/or received parameters and train the machine learning system using attributes for personal data records as inputs and a value indicating existence or non-existence of a particular status as outputs.

At step 312, the server computer determines whether the machine learning system satisfies a second criterion. The second criterion may relate to an accuracy of the machine learning system, thereby ensuring that the machine learning system is unable to memorize inputs completely. For example, the second criterion may be a maximum average computed percent chance of the status value when using the machine learning system to compute outputs for the input training datasets which included the status as an output.

In an embodiment, the second criterion comprises a minimum fraction of population at risk based on the machine learning system. For example, the server computer may use the trained machine learning system to compute outputs for a plurality of input datasets. The input datasets may include datasets generated from stored data that was not used to train the machine learning system, datasets that were used to train the machine learning system, and/or datasets received with the initial instructions to generate and train the machine learning system. The server computer may then compute a fraction of population at risk based on a number of positive outputs from the plurality of input datasets and/or a number of instances in the training dataset of a positive status value. An example equation may comprise:

$$R = \frac{T}{P}$$

where R is the fraction of the population at risk, T is the number of instances in the training dataset of a true positive for the output value, and P is the number of positive predictions from using the machine learning system on the plurality of input datasets. The server computer may store a maximum threshold value for R as the second criterion, such as 0.2. Thus, if R is greater than 0.2, the server computer may determine that the machine learning system does not satisfy the second criterion.

If the machine learning system does not satisfy the second criterion, at step 316 the server computer rejects the request for a machine learning system. For example, the server computer may send data to a requesting computing device rejecting the request for the machine learning system. The rejection may state that the second criterion was not satisfied. In an embodiment, the server computer, after sending the rejection, may receive another request to generate a machine learning system. If the rejection was received based on the first criteria, the server computer continues with step 306. If the rejection was received based on the second criteria and the selected inputs and outputs remained the same, the server computer may skip checking the first criteria which is known to be satisfied. For example, the second request may specify the same inputs and outputs, but vary the parameters for training the machine learning system in an attempt to decrease its accuracy or the percentage of the population at risk. The server computer may generate a new machine learning system with the new parameters, train the new machine learning system with the same training dataset, and determine whether the new machine learning system satisfies the second criterion.

If the machine learning system satisfies the second criterion, at step 314 the server computer sends the trained machine learning system to the requesting computing device. For example, the server computer may release the trained machine learning system from the protected environment to the requesting device in response to determining that all criteria have been satisfied. The trained machine learning system may comprise weight values for each of the columns without including any of the training data used to create the trained machine learning system, thereby providing protection of personal data while still providing a machine learning system trained based on the personal data. As the server computer is configured to perform these tasks without allowing any external access to the data stored in the server computer, the server computer provides a means for utilizing protected or personal information without providing any knowledge of the protected or personal information.

5. Media Server Implementation

Figure 4:
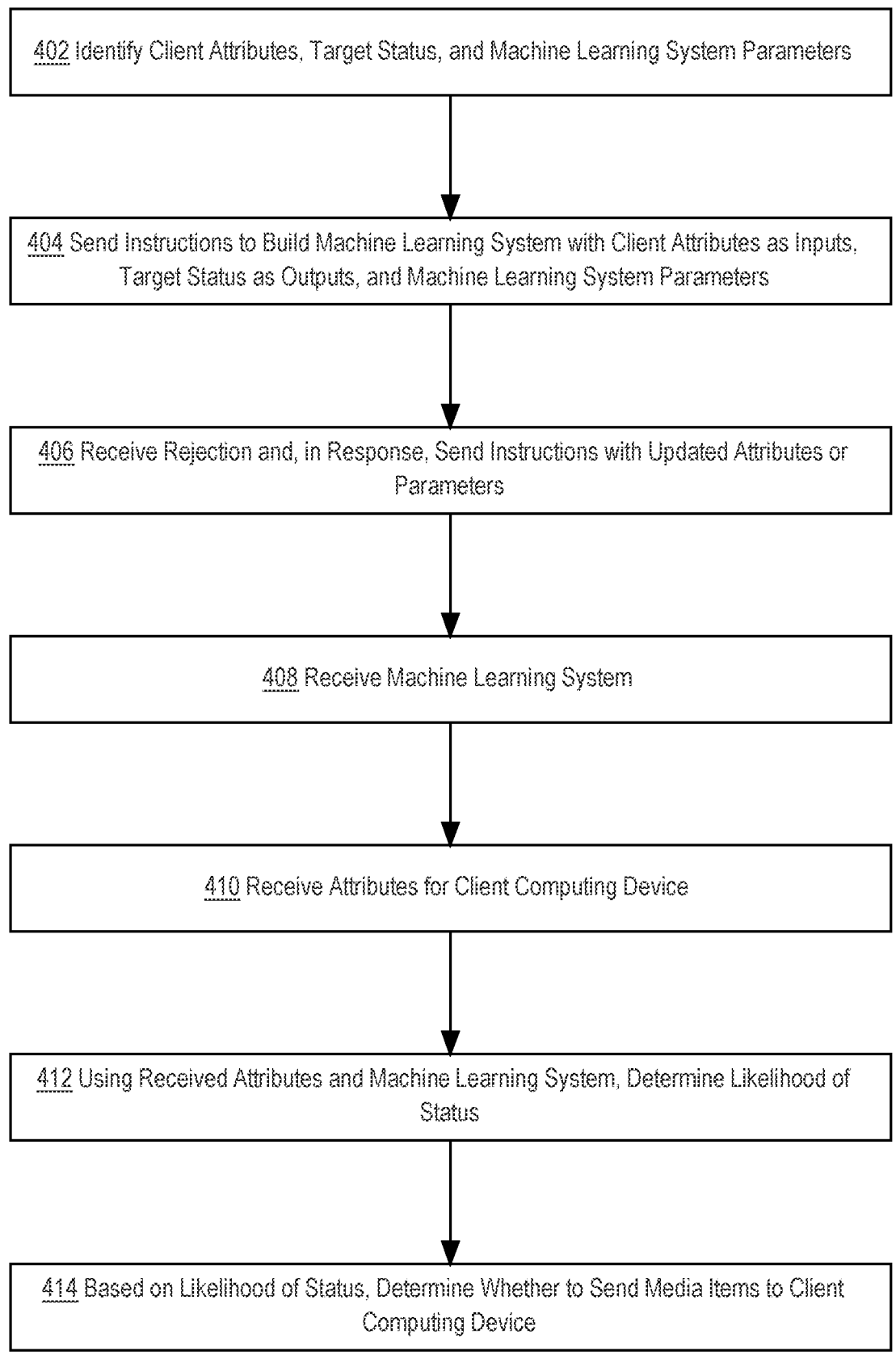
FIG. 4 depicts an example method for utilizing a secure environment to build and validate machine learning systems.

FIG. 4 depicts an example method for utilizing a secure environment to build and validate machine learning systems.

At step 402, a media server identifies client attributes, a target status, and machine learning system parameters. For example, the media server may receive input specifying client attributes for inputs and a target status as the output. The media server may additionally receive input specifying the machine learning parameters. Additionally or alternatively, the media server may store initial machine learning parameters. In an embodiment, the media server further receives input specifying a type of machine learning system to build.

At step 404, the media server sends instructions, to a secure environment, to build a machine learning system with the identified client attributes as inputs, target status as outputs, and the machine learning system parameters. For example, the media server may send instructions through an API of a server computer executing the secure environment to build a machine learning system, the instructions identifying the attributes to use as inputs and the status value to use as the output.

At optional step 406, if the media server receives a rejection, the media server, in response, sends instructions with updated attributes or parameters. The media server may receive a rejection if training data or the machine learning system failed to meet one or more criteria. The media server may cause display of an error message and request different inputs, outputs, and/or parameters to send to the server computer. In an embodiment, the media server may be configured to vary parameters for the machine learning system when an error is received based on the machine learning system failing to meet one or more criteria. For example, the media server may be configured to change a number of nodes or a number of layers pseudo-randomly and/or based on a stored second set of parameters.

At step 408, the media server receives a trained machine learning system. For example, the media server may receive the trained machine learning system from the secure environment when the machine learning system has satisfied stored criteria. The media server may store the machine learning system and identifiers of the attributes used as inputs and status used as the output for the machine learning system.

At step 410, the media server receives attributes for a client computing device. The media server may be configured to determine whether to serve a particular media item to the client computing device. For example, the media server may be configured to determine which computing devices to send an advertisement for a diabetes medication. The media server may receive the attributes for the client computing device prior to the steps 402-408 or after. For example, the media server may store attributes for a plurality of client computing devices prior to receiving a request for media to be sent to the client computing device.

Additionally or alternatively, the media server may request attribute data from an outside source, such as an attribute database, based on information received from the client computing device. For example, the media server may receive a request to display media on a client computing device, such as in response to a client computing device navigating to a particular webpage. The media server may additionally receive data from the client computing device or from an external source which the media server may send to the attribute database with a request for attributes of the client computing device. The request may specify the attributes used to train the machine learning system.

At step 412, the media server uses received attributes and the machine learning system to determine a likelihood of a status. The media server may use the attributes as inputs into the machine learning system to compute an outcome value indicating a likelihood of the status. Thus, if the machine learning system was trained using a diagnosis of Type 2 Diabetes as the output, the media server may use the attributes to compute a likelihood of Type 2 Diabetes based on the input attributes. The server computer may compute the likelihood of the status in response to receiving a request for media and/or in advance of receiving the request. For example, the server computer may compute likelihoods for a plurality of client computing devices and store the likelihood values to be used later.

In an embodiment, the media server performs steps 402-412 a plurality of times for a single client computing device. For example, the media server may request a plurality of machine learning systems from a protected environment, each trained with a different status value as the output. The media server may use the plurality of trained machine learning systems to compute a plurality of likelihood values, each corresponding to a different status. The media server may store the plurality of likelihood values for use in determining which media item to send to a client computing device.

At step 414, based on the likelihood of the status, the media server determines whether to send media items to the client computing device. For example, the media server may store a media item corresponding to a particular status. The media server may determine whether the likelihood of the status for the client computing device is greater than a stored threshold value, such as 80%. If the likelihood is greater than the stored threshold value, the media server may send the media item to the client computing device. If the likelihood is not greater than the stored threshold value, the media server may send a different media item to the client computing device.

In an embodiment, the media server selects one of a plurality of media items based on a plurality of likelihood values. For example, the media server may store a plurality of media items, each corresponding to one or a plurality of statuses. The media server may use a plurality of machine learning systems, each trained with one of the plurality of statuses as an output, to compute a plurality of likelihoods of a status for the client computing device. The media server may identify the status with the highest likelihood and select the media item corresponding to the identified status. The media server may then send the selected media item to the client computing device.

In an embodiment, the media server uses the likelihood of the status to determine a value for one or more media items. For example, the media server may receive a request to send a plurality of media items, such as one thousand media items, to client computing devices corresponding to personal data records with the status value. If the likelihood of the status for a particular personal data record is 50%, the media server may value sending the media item to the client computing device as being valued as one half of a personal data record corresponding to the status. Thus, if the request was for one thousand media items to be sent to client computing devices corresponding to personal data records with the status value, the media server may send media items to client computing devices until a value of personal data records sent corresponds to one thousand, such as two thousand media items being sent to client computing devices corresponding to personal data records with a 50% likelihood of the status value. Additionally or alternatively, the media server may use the likelihood of the status to dynamically price sending media items to client computing devices. For example, if a price for sending a media item to a client computing device corresponding to a personal data record with the status value is $10, the media server may charge $5 for sending the media item to a client computing device corresponding to a personal data record with a 50% likelihood of the status value.

6. Outcome Implementation

In an embodiment, the systems and methods described herein may be used to identify effects of particular actions on a status of a personal data record while protecting the used information. For example, the server computer may determine, within the protected environment, a percentage of identified personal data records with a particular status or a percentage of identified personal data records which received a benefit based on a request from an external computing device, such as the media server. Embodiments are described further herein.

In an embodiment, the server computer determines a percentage of identified personal data records with a particular status. For example, after sending media items to a plurality of client computing devices, the media server may store identifiers for a plurality of personal data records corresponding to computing devices which received media items corresponding to a particular status, such as cookie identifiers. The media server may send to the server computer, the identifiers and an identification of the particular status. In an embodiment, the media server generates unique tokens for the plurality of personal data records using the methods described herein and sends the generated unique tokens to the server computer with an identification of the status. The server computer may match the received identifiers to personal data records stored in the protected environment, such as through a mapping of cookie identifiers to personal data records. The server computer may then determine, within the protected environment, for each identifier, whether the identifier corresponds to the particular status. As an example, the server computer may determine whether a particular ICD-10 code is listed in a row corresponding to the personal data record. The server computer may determine a number and/or percentage of identifiers that correspond to the particular status and send the number and/or percentage to the media server.

In an embodiment, the server computer may be configured to only send the number or percentage of identifiers from the protected environment in response to determining that the number and/or percentage satisfies a third criterion. The third criterion may be a minimum number of total identifiers, a maximum number and/or percentage of identifiers with the particular status, or a minimum number or percentage of identifiers with the particular status. By using a third criterion, the server computer may ensure that protected information is not released to the media server.

In an embodiment, the server computer is configured to determine a benefit for one or more personal data records based on additional received claims data. For example, the claims processor may send additional claims data to the server computer. The server computer may receive the additional claims data and correlate the additional claims data with previously stored claims data, such as through unique identifiers generated by the claims processor. The server computer may additionally receive data from the media server comprising a plurality of identifiers of personal data records corresponding to computing devices which received a media item corresponding to a particular status. The server computer may determine, from the plurality of identifiers of personal data records and the received additional claims data, a number and/or percentage of personal data records which received a benefit. A benefit, as used herein, comprises a determination made by the server computer of a change in a status of a personal data record that has been defined as beneficial. Definitions used by the server computer as a "benefit" are further described herein.

In an embodiment, a benefit is defined as an additional status corresponding to the personal data record. For example, the server computer may receive an identification, from the media server, of a prescription code for a medication corresponding to a sent media item. The server computer may determine, from the additional claims data, whether any of the personal data records corresponding to the identifiers received from the media server comprise the prescription code for the medication. The server computer may compute a number and/or percentage of the identifiers which correspond to personal data records that comprise the prescription code in the additional claims data and send the number and/or percentage to the media server.

A benefit may also be defined as removal or change of a status in corresponding data records. For example, the server computer may be configured to determine a benefit has occurred if the particular status is listed as removed in future data records, has been changed to a status identified by the media server, such as a less severe version of a disease, or if a different status, such as a prescription for a pain medication, has been removed, thereby indicating that pain management is no longer necessary. In an embodiment, the benefit may be defined by a number of claims, such as a decrease in a number of doctor visits or a decrease in refills of a prescription.

In an embodiment, the benefit is defined by a request from the media server. For example, the media server may send a request to the server computer comprising a plurality of identifiers and one or more statuses and/or status changes for the plurality of identifiers. As a practical example, the media server may send a request for identification of a number and/or percentage of identifiers sent by the media server that correspond to personal data records which had a removal of a particular status in additional claims data. The server computer may identify, of the identifiers sent by the media server, each identifier that initially corresponded to the particular status. The server computer may then identify, of the identifiers that corresponded to the particular status, which identifiers had a removal of the particular status in the future claims data. The server computer may then send a number or percentage of received identifiers that had the removal of the particular status in future claims to the media server.

7. Benefits of Certain Embodiments

The systems and methods described herein contribute to the technical character of machine learning system use by being particularly adapted to a specific technical implementation where instructions to generate a training dataset and machine learning system and to train said machine learning system using the training dataset are received from an external server computer. Meanwhile, the server computer within the protected environment is used to train and validate the machine learning system which is then released from the protected environment to be used by the external computing system. This unique technical implementation of machine learning systems provides additional data protections for information stored by the server computer by performing the training and validations in the server computer in a manner where the initial training data cannot be viewed by a user of an external device.

The systems and methods described herein further provide a practical application of a machine learning system through the generation and training of the machine learning system in a protected environment in a server computer. These systems and methods provide a particular means of solving a technical problem, the use of protected information without providing said protected information into an environment where it can be seen or used by a user. By using stored rules to validate the machine learning system in the protected environment and providing a means for defining the generation and training of the machine learning system from outside the environment and without access to the training data, the systems and methods described herein provide a technical solution to a technical problem of how to provide a trained machine learning system which protects training data without providing access to said training data.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
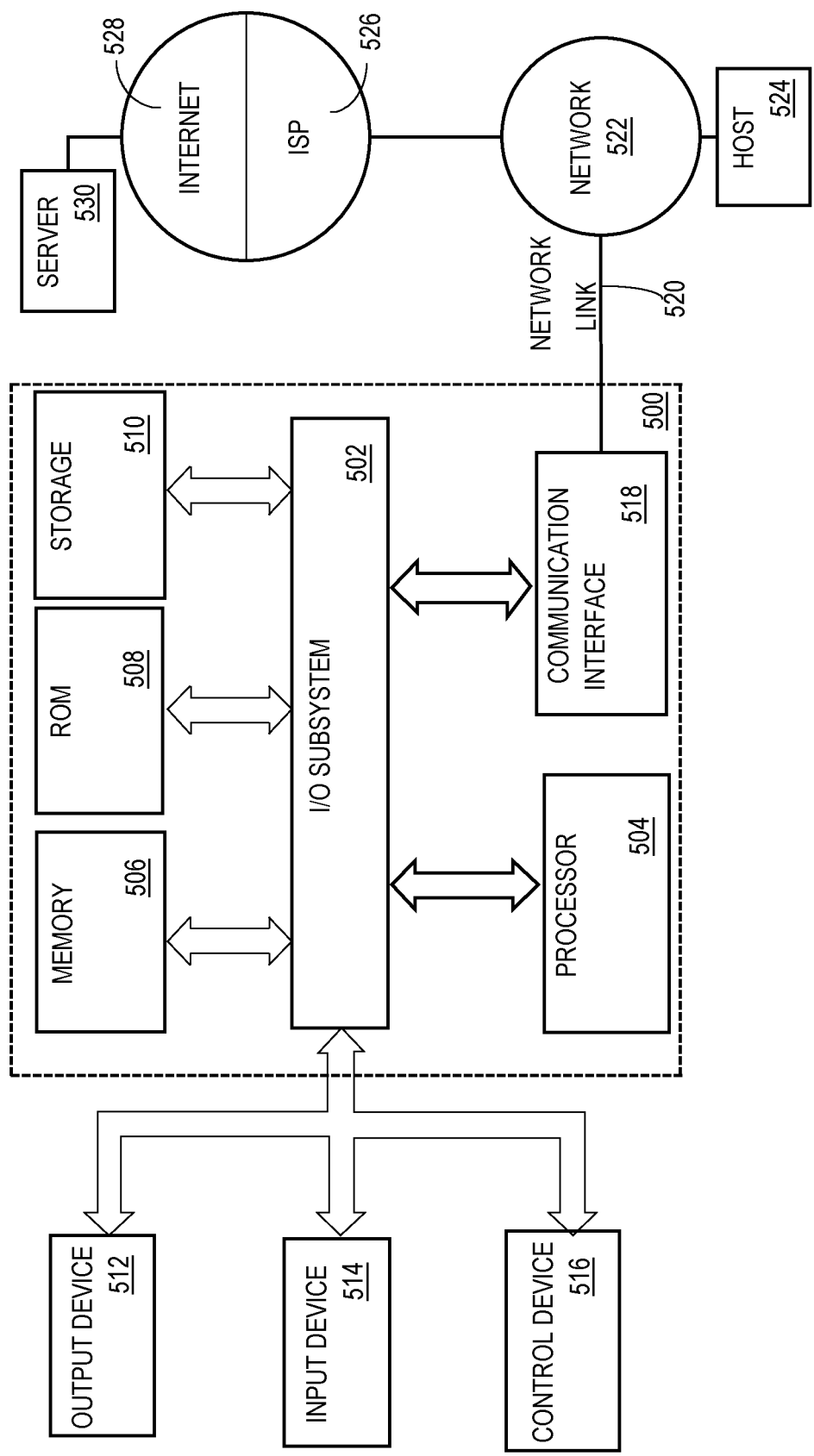
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, the method being executed after the following steps have occurred:
    first data identifying one or more status values of a plurality of personal data records having been sent to a server computer executing within a protected environment from a processor server and stored in a de-identified manner through a generation of a unique identifier for each personal data record using a unique identifier generation scheme and encrypted using an encryption scheme;
    second data comprising a plurality of attributes for each of the plurality of personal data records having been sent to the server computer from a database and stored in a de-identified manner through a generation of the unique identifier for each personal data record using the unique identifier generation scheme and encrypted using the encryption scheme;
    the method comprising:
    electronically transmitting to the server computer executing within the protected environment, instructions to generate a machine learning system and to train the machine learning system using the first data and the second data;
    the server computer being configured to train the machine learning system from within the protected environment only if the first data and the second data satisfy a first criterion and is configured to transmit the trained machine learning system only if the trained machine learning system satisfies a second criterion;
    receiving the trained machine learning system from the protected environment;
    using the trained machine learning system, determining, for each of a plurality of sets of attributes, a likelihood that a personal data record corresponding to the set of attributes has a particular status value;
    in response to determining that the likelihood that the personal data record corresponding to the set of attributes has the particular status value is greater than a threshold value, sending one or media items to a client computing device.

2. A computer-implemented method comprising:
    storing, at a server computer executing within a protected environment, first data comprising a plurality of attributes for a plurality of personal data records and second data indicating, for each personal data record of the plurality of personal data records, secure data relating to a status value of the personal data record;
    receiving, from outside the protected environment, a request to generate and train a machine learning system using a subset of the first data comprising one or more of the plurality of attributes as inputs and a subset of the second data indicating whether a personal data record has a status value as outputs;
    determining, in the protected environment, whether the first data and second data satisfy a first criterion with relation to the status value;
    only if the first data and second data satisfy the first criterion with respect to the status value, training a machine learning system using the subset of the first data as inputs and the subset of the second data as outputs;
    determining whether the trained machine learning system satisfies a second criterion;
    only if the trained machine learning system satisfies the second criterion, transmitting the trained machine learning system outside the protected environment in response to the request.

3. The method of claim 2, wherein the first criterion is a minimum number of instances in the second data of a personal data record having the status value.

4. The method of claim 2, wherein the second criterion is a maximum fraction of population at risk.

5. The method of claim 4, wherein the maximum fraction of population at risk is computed as a quotient of a number of instances in the subset of the first data of a patient having the status value and a number of positive predictions of the status value from applying the trained machine learning system to each of the plurality of personal data records in the first data.

6. The method of claim 2, further comprising:
    receiving, in the protected environment, third data comprising unique identifiers for a second plurality of personal data records who received media relating to the status value;
    determining, in the protected environment, a percentage of the plurality of the second plurality of personal data records who have the status value;
    sending, from the protected environment, data indicating the percentage of the second plurality of personal data records who have the status value.

7. The method of claim 6, further comprising:
    determining that the percentage of the second plurality of personal data records who have the status value satisfies a third criterion;
    only sending the data indicating the percentage of the second plurality of personal data records who have the status value in response to determining that the percentage of the second plurality of personal data records who have the status value satisfies the third criterion.

8. The method of claim 2, further comprising:
    receiving, in the protected environment, third data comprising unique identifiers for a second plurality of personal data records who received media relating to the status value;
    receiving, in the protected environment, future status value data for a third plurality of personal data records;
    identifying a subset of the second plurality of personal data records who have the status value;
    based on the future status value data, identifying a percentage of the second plurality of personal data records who received a benefit after receiving the media relating to the status value;
    sending, from the protected environment, data indicating the percentage of the second plurality of personal data records who received a benefit after receiving the media relating to the status value.

9. The method of claim 2, wherein training the machine learning system comprises:
    training the machine learning system with a first set of parameters;
    determining that the trained machine learning system does not satisfy the second criterion and, in response, training the machine learning system using a second set of parameters.

10. The method of claim 2, wherein the status value is a particular medical diagnosis or prescription.

11. A method comprising:
    sending, to a server computer executing within a protected environment, instructions to generate and train a machine learning system using attributes as inputs and existences of a status value as outputs, the server computer storing first data comprising a plurality of attributes for a plurality of personal data records and second data indicating, for each personal data record of the plurality of personal data records, whether the personal data record has the status value;

wherein the server computer is configured to only train the machine learning system in the protected environment if the first data and the second data satisfy a first criterion and is only configured to transmit the trained machine learning system if the trained machine learning system satisfies a second criterion;

receiving the trained machine learning system from the protected environment;

using trained machine learning system, determining, for each of a plurality of sets of attributes, a likelihood that a personal data record corresponding to the set of attributes has the status value;

if the likelihood that the personal data record corresponding to the set of attributes has the status value is greater than a threshold value, sending one or more media items to a client computing device corresponding to the personal data record.

12. The method of claim 11, wherein the first criterion is a minimum number of instances in the second data of a personal data record having the status value.

13. The method of claim 11, wherein the second criterion is a maximum fraction of population at risk.

14. The method of claim 11, further comprising:
storing a plurality of data records comprising a data record for each personal data record corresponding to a client computing device that received the one or more media items;
sending, to the server computer, the plurality of data records;
receiving, from the server computer, data indicating a percentage of the plurality of data records corresponding to a personal data record that has the status value.

15. The method of claim 11, wherein the status value is a particular medical diagnosis or prescription.

16. A computer system comprising:
one or more processors;
a memory storing instructions which, when executed by the one or more processors, causes performing, in a protected environment:
storing first data comprising a plurality of attributes for a plurality of personal data records and second data indicating, for each personal data record of the plurality of personal data records, secure data relating to a status value of the personal data record;
receiving, from outside the protected environment, a request to generate and train a machine learning system using a subset of the first data comprising one or more of the plurality of attributes as inputs and a subset of the second data indicating whether a personal data record has a status value as outputs;
determining, whether the first data and second data satisfy a first criterion with relation to the status value;
only if the first data and second data satisfy the first criterion with respect to the status value, training a machine learning system using the subset of the first data as inputs and the subset of the second data as outputs;
determining whether the trained machine learning system satisfies a second criterion;
only if the trained machine learning system satisfies the second criterion, transmitting the trained machine learning system outside the protected environment in response to the request.

17. The system of claim 16, wherein the first criterion is a minimum number of instances in the second data of a personal data record having the status value.

18. The system of claim 16, wherein the second criterion is a maximum fraction of population at risk.

19. The system of claim 18, wherein the maximum fraction of population at risk is computed as a quotient of a number of instances in the subset of the first data of a patient having the status value and a number of positive predictions of the status value from applying the trained machine learning system to each of the plurality of personal data records in the first data.

20. The system of claim 16, wherein the instructions, when executed by the one or more processors, further cause performing, in the protected environment:
receiving third data comprising unique identifiers for a second plurality of personal data records who received media relating to the status value;
determining a percentage of the plurality of the second plurality of personal data records who have the status value;
sending, from the protected environment, data indicating the percentage of the second plurality of personal data records who have the status value.

21. The system of claim 20, wherein the instructions, when executed by the one or more processors, further cause performing, in the protected environment:
determining that the percentage of the second plurality of personal data records who have the status value satisfies a third criterion;
only sending the data indicating the percentage of the second plurality of personal data records who have the status value in response to determining that the percentage of the second plurality of personal data records who have the status value satisfies the third criterion.

22. The system of claim 16, wherein the instructions, when executed by the one or more processors, further cause performing, in the protected environment:
receiving third data comprising unique identifiers for a second plurality of personal data records who received media relating to the status value;
receiving, future status value data for a third plurality of personal data records;
identifying a subset of the second plurality of personal data records who have the status value;
based on the future status value data, identifying a percentage of the second plurality of personal data records who received a benefit after receiving the media relating to the status value;
sending, from the protected environment, data indicating the percentage of the second plurality of personal data records who received a benefit after receiving the media relating to the status value.

23. The system of claim 16, wherein training the machine learning system comprises:
training the machine learning system with a first set of parameters;
determining that the trained machine learning system does not satisfy the second criterion and, in response, training the machine learning system using a second set of parameters.

24. The system of claim 16, wherein the status value is a particular medical diagnosis or prescription.

25. A computer system comprising:
one or more processors;
a memory storing instructions which, when executed by the one or more processors, causes performing:
sending, to a server computer executing within a protected environment, instructions to generate and train a machine learning system using attributes as inputs and existences of a status value as outputs, the server computer storing first data comprising a plurality of attributes for a plurality of personal data records and second data indicating, for each personal data record of the plurality of personal data records, whether the personal data record has the status value;
wherein the server computer is configured to only train the machine learning system in the protected environment if the first data and the second data satisfy a first criterion and is only configured to transmit the trained machine learning system if the trained machine learning system satisfies a second criterion;
receiving the trained machine learning system from the protected environment;
using trained machine learning system, determining, for each of a plurality of sets of attributes, a likelihood that a personal data record corresponding to the set of attributes has the status value;
sending one or more media items to the client computing device corresponding to the personal data record.

26. The system of claim 25, wherein the instructions, when executed by the one or more processors, further cause performing:
determining that the likelihood that the personal data record corresponding to the set of attributes has the status value is greater than a threshold value and, in response, performing the sending of the one or more media items to a client computing device corresponding to the personal data record.

27. The system of claim 25 wherein the instructions, when executed by the one or more processors, further cause performing:
determining a value of sending the one or more media items to the client computing device based, at least in part, on the likelihood that the personal data record corresponding to the set of attributes has the status value.

28. The system of claim 25, wherein the first criterion is a minimum number of instances in the second data of a personal data record having the status value.

29. The system of claim 25, wherein the second criterion is a maximum fraction of population at risk.

30. The system of claim 25, wherein the instructions, when executed by the one or more processors, further cause performing:
storing a plurality of data records comprising a data record for each personal data record corresponding to a client computing device that received the one or more media items;
sending, to the server computer, the plurality of data records;
receiving, from the server computer, data indicating a percentage of the plurality of data records corresponding to a personal data record that has the status value.

31. The system of claim 25, wherein the status value is a particular medical diagnosis or prescription.

* * * * *